United States Patent
Koizumi et al.

(10) Patent No.: US 8,974,882 B2
(45) Date of Patent: Mar. 10, 2015

(54) METHOD FOR PRODUCING THERMOPLASTIC RESIN FOAMED BLOW-MOLDED ARTICLE AND THERMOPLASTIC RESIN FOAMED BLOW-MOLDED ARTICLE

(71) Applicant: JSP Corporation, Tokyo (JP)

(72) Inventors: Tatsuya Koizumi, Kanuma (JP); Masahiro Gomibuchi, Shimotsuke (JP)

(73) Assignee: JSP Corporation, Tokyo (JP)

( * ) Notice: Subject to any disclaimer, the term of this patent is extended or adjusted under 35 U.S.C. 154(b) by 0 days.

(21) Appl. No.: 14/096,722

(22) Filed: Dec. 4, 2013

(65) Prior Publication Data

US 2014/0171533 A1 Jun. 19, 2014

(30) Foreign Application Priority Data

Dec. 13, 2012 (JP) .................. 2012-272238

(51) Int. Cl.
| | | |
|---|---|---|
| C08J 9/12 | (2006.01) |
| C08L 71/12 | (2006.01) |
| B29C 44/00 | (2006.01) |
| B29C 44/04 | (2006.01) |
| B29D 22/00 | (2006.01) |
| C08L 71/00 | (2006.01) |
| B29C 49/04 | (2006.01) |
| C08L 25/06 | (2006.01) |
| B29C 47/00 | (2006.01) |
| B29C 44/50 | (2006.01) |
| B29C 44/56 | (2006.01) |
| B29C 49/46 | (2006.01) |

(52) U.S. Cl.
CPC ............ C08L 71/00 (2013.01); B29C 49/04 (2013.01); C08L 25/06 (2013.01); B29C 47/0054 (2013.01); B29C 44/50 (2013.01); B29C 44/56 (2013.01); B29C 2049/4667 (2013.01)

USPC ............ 428/36.5; 521/139; 525/132; 264/51

(58) Field of Classification Search
USPC ........ 264/45.5, 54, 51; 525/68, 132; 521/139; 428/36.5
See application file for complete search history.

(56) References Cited

U.S. PATENT DOCUMENTS

| 4,900,786 A | * | 2/1990 | Abolins et al. ............ 525/68 |
| 5,863,489 A | * | 1/1999 | Flood et al. ............... 264/531 |
| 6,432,525 B1 | | 8/2002 | Gokuraku et al. |
| 2006/0106122 A1 | * | 5/2006 | Naito et al. ............... 521/79 |
| 2012/0141794 A1 | | 6/2012 | Harada et al. |

FOREIGN PATENT DOCUMENTS

| JP | A 52-101268 | 8/1977 |
| JP | A 2-218727 | 8/1990 |
| JP | A 2003-138051 | 5/2003 |
| JP | B2 3745960 | 12/2005 |
| JP | A 4712914 | 4/2011 |
| JP | B2 4712914 | 4/2011 |

* cited by examiner

*Primary Examiner* — Kara Boyle
(74) *Attorney, Agent, or Firm* — Oliff PLC

(57) ABSTRACT

Provided is a hollow foamed blow-molded article having a high heat resistance, employing a thermoplastic resin composition containing a mixed resin of a polyphenylene ether resin and a polystyrene resin, as a base resin. The foamed blow-molded article, may be produced by extruding a foamable molten resin composition obtained by kneading the thermoplastic resin composition and a blowing agent to form a foamed parison, and blow molding the foamed parison. A glass transition temperature of the thermoplastic resin composition is 110° C. or higher. A melt viscosity of the thermoplastic resin composition at a temperature of the glass transition temperature+80° C. and at a shear rate of 100/sec is 3000 to 9500 Pa·s. The physical blowing agent is a blowing agent containing a hydrocarbon compound having 3-5 carbon atoms. A blending amount of the physical blowing agent is 0.4 to 1 mol per kg of the thermoplastic resin composition.

4 Claims, No Drawings

METHOD FOR PRODUCING THERMOPLASTIC RESIN FOAMED BLOW-MOLDED ARTICLE AND THERMOPLASTIC RESIN FOAMED BLOW-MOLDED ARTICLE

BACKGROUND

1. Technical Field

The present invention relates to a method for producing a thermoplastic resin foamed blow-molded article, especially a thermoplastic resin foamed blow-molded article employing a thermoplastic resin composition containing a mixed resin of a polyphenylene ether resin and a polystyrene resin, as a base resin; and a thermoplastic resin foamed blow-molded article employing a thermoplastic resin composition containing a mixed resin of a polyphenylene ether resin and a polystyrene resin, as a base resin.

2. Related Art

A thermoplastic resin containing a mixed resin of a polyphenylene ether resin and a polystyrene resin (hereinafter, also referred to as a modified polyphenylene ether resin) is characterized in that the heat resistance is high, balance of the mechanical strength is excellent, and further a flame retardant treatment is readily performed. Therefore, taking advantage of these characteristics, the thermoplastic resin has been used in a wide variety of fields of housing of an electric equipment, automobile parts, and the like.

Conventionally, as this modified polyphenylene ether resin foam, for example, a foamed particle molded article produced by a so-called in-mold molding method in which resin particles are prepared by employing a mixed resin of a polyphenylene ether resin and a polystyrene resin, as a base resin, and foamable resin particles obtained by containing a blowing agent into the resin particles, or foamed particles obtained by foaming the foamable resin particles are filled in a cavity of the mold to be molded, has been known (for example, Japanese Patent Application Laid-Open (JP-A) No. S52-101268, and Japanese Patent No. 4712914).

Further, a sheet that is produced by kneading a mixed resin of a polyphenylene ether resin and a polystyrene resin, and a physical blowing agent to perform extrusion foaming, and then collecting the resultant along a cooling device such as a sizing drum, has been known (for example, JP-A No. H02-218727).

On the other hand, as a production method of a foamed molded article, there is a method in which a foamable molten resin obtained by kneading a thermoplastic resin and a blowing agent is extruded to forma foamed parison, and then the foamed parison is blow molded during being in a softened state to produce a foamed blow-molded article. By using the foaming blow-molding method, since a hollow molded article with an atypical shape can be produced in one step process, a foamed blow-molded article obtained by employing a polypropylene resin as abase resin is, taking advantage of features of the lightness and the thermal insulation, used for a duct for automotive air conditioner, and the like (for example, Japanese Patent No. 3745960).

In a thermoplastic resin foam composed of a polyphenylene ether resin and a polystyrene resin, an extrusion foam in which a phosphorus type compound, a compound having a triazine skeleton, and polyhydric alcohols are contained into the thermoplastic resin, and melting deformation and melting dripping during combustion are improved, has been disclosed (for example, JP-A No. 2003-138051).

However, it is difficult to produce a hollow foamed blow-molded article employing a thermoplastic resin composition containing a mixed resin of a polyphenylene ether resin and a polystyrene resin, as a base resin, by a foaming blow-molding method, and thus the foaming blow-molding method has not been practically industrially performed in the past.

The present invention relates to a method for producing a hollow foamed blow-molded article, and an object of the present invention is to provide a hollow foamed blow-molded article that employs a thermoplastic resin composition containing a mixed resin of a polyphenylene ether resin and a polystyrene resin, as a base resin, has a low apparent density and heat resistance, and is highly expanded; and a production method thereof.

SUMMARY the present inventors have conducted various investigations for a method for producing a hollow foamed blow-molded article by a foaming blow method using a foamable molten resin that is obtained by kneading a thermoplastic resin composition containing a mixed resin of a polyphenylene ether resin and a polystyrene resin with a blowing agent, and have found that when the melt viscosity of a thermoplastic resin composition that constitutes a foamed blow-molded article, under a specific temperature condition is in a specific range, an excellent foamed parison can be formed, and thus an excellent foamed blow-molded article can be obtained. Based on these findings, the present inventors have completed the present invention.

The present invention relates to a method for producing a thermoplastic resin foamed blow-molded article described in the following [1] to [4], and to a thermoplastic resin hollow foamed blow-molded article described in the following [5] to [8].

[1] A method for producing a thermoplastic resin foamed blow-molded article, comprising: extruding a foamable molten resin composition obtained by kneading a thermoplastic resin composition containing a mixed resin of a polyphenylene ether resin and a polystyrene resin, and a physical blowing agent by an extruder, through a die to form a foamed parison; and blow molding the foamed parison during being in a softened state to produce a foamed blow-molded article, wherein a glass transition temperature of the thermoplastic resin composition is 110° C. or higher, a melt viscosity of the thermoplastic resin composition at a temperature of the glass transition temperature+80° C. and at a shear rate of 100/sec is 3000 to 9500 Pa·s, the physical blowing agent is a blowing agent containing a hydrocarbon compound having 3 to 5 carbon atoms, and a blending amount of the physical blowing agent is 0.4 to 1 mol per 1 kg of the thermoplastic resin composition.

[2] The method for producing a thermoplastic resin foamed blow-molded article described in [1], wherein a blending amount of a polyphenylene ether resin in the thermoplastic resin composition is 20 to 70% by weight.

[3] The method for producing a thermoplastic resin foamed blow-molded article described in [1], wherein the thermoplastic resin composition is blended with a phosphorus type flame retardant having a melting point of 100° C. or lower, and the blending amount of the phosphorus type flame retardant is 5 to 15% by weight relative to the thermoplastic resin composition.

[4] The method for producing a thermoplastic resin foamed blow-molded article described in [3], wherein the phosphorus type flame retardant having a melting point of 100° C. or lower is an aromatic phosphate, or an aromatic condensed phosphate.

[5] A thermoplastic resin hollow foamed blow-molded article, comprising a thermoplastic resin composition containing a mixed resin of a polyphenylene ether resin and a polystyrene resin as a base resin, wherein a glass transition temperature of a thermoplastic resin composition constituting the foamed blow-molded article is 110° C. or higher, a melt viscosity of the thermoplastic resin composition at a temperature of the glass transition temperature+80° C. and at a shear rate of 100/sec is 3000 to 9500 Pa·s, and an apparent density of the foamed blow-molded article is 0.07 to 0.3 g/cm³.

[6] The thermoplastic resin foamed blow-molded article described in [5], wherein a blending amount of a polyphenylene ether resin in the thermoplastic resin composition is 20 to 70% by weight.

[7] The thermoplastic resin foamed blow-molded article described in [5], wherein the thermoplastic resin composition is blended with a phosphorus type flame retardant having a melting point of 100° C. or lower, and the blending amount of the phosphorus type flame retardant is 5 to 15% by weight relative to the thermoplastic resin composition.

[8] The thermoplastic resin foamed blow-molded article described in [7], wherein the phosphorus type flame retardant having a melting point of 100° C. or lower is an aromatic phosphate, or an aromatic condensed phosphate.

According to the present invention, a foamed blow-molded article described above [1], which has a low apparent density and high heat resistance, and is hollow and highly expanded, can be produced by extruding a foamable molten resin obtained by kneading a thermoplastic resin composition containing a mixed resin of a polyphenylene ether resin and a polystyrene resin, which shows a specific melt viscosity under a specific temperature condition, and a physical blowing agent, through a die to form a foamed parison; and blow molding the foamed parison.

A hollow foamed blow-molded article according to the present invention is lightweight and excellent in the heat resistance, and thus is useful for electric and electronic parts, parts for vehicles, or interior materials. Further, the foamed blow-molded article according to the present invention, in which a flame retardant is blended, shows flame retardancy of V-0 to V-1 as measured according to the burn test UL-94 in the UL standards, therefore is useful for aircraft parts, parts for railway vehicles, and the like that require flame retardancy and high heat resistance.

DETAILED DESCRIPTION

The present invention will be specifically described below.

The present invention relates to a method for producing a hollow foamed blow-molded article comprising: extruding a foamable molten resin composition obtained by kneading a thermoplastic resin composition containing a mixed resin of a polyphenylene ether resin and a polystyrene resin as a base resin and a physical blowing agent by an extruder, through a die, for example, extruding to a tubular shape through a die having an annular slit (i.e.; a circular die), to form a foamed parison; and blow molding the foamed parison during being in a softened state.

First of all, in order to obtain an excellent hollow foamed blow-molded article, it is required to form a foamed parison in an excellent foamed state. If the foamed parison has a broken cell structure and forms open cells, the blow moldability of the foamed parison is significantly lowered, and thus not only the thickness accuracy of the obtained molded article is reduced, but also a molded article with the intended shape may not be obtained.

Next, when a parison is blow molded, in order to mold a molded article that reflects the exact shape of mold, during the extrusion through a die to the blow molding, the parison is required to maintain the softened state. In particular, in a foaming blow-molding method in which a parison in a foamed state is blow molded, while maintaining the softened state of the foamed parison, it is required not to break the cells, and further not to have excessive draw down of the foamed parison. When the draw down is too large, the cells of the foamed parison are excessively deformed, thus not only the mechanical strength in the part of the foamed blow-molded article is reduced, but also the blow moldability is deteriorated, and an excellent hollow foamed blow-molded article cannot be obtained.

It has been known that the glass transition temperature of a thermoplastic resin composition containing a mixed resin of a polyphenylene ether resin and a polystyrene resin varies depending on the blend ratio of the polystyrene resin to the polyphenylene ether resin, and according to the increase of the blend ratio of the polystyrene resin, the glass transition temperature shows a tendency of the decrease.

Thus, the present inventors focused on the relationship between the glass transition temperature and the melt viscosity of a modified polyphenylene ether resin that is a mixed resin of a polyphenylene ether resin and a polystyrene resin, obtained by melting and kneading them, conducted investigations of the foaming blow moldability for the modified polyphenylene ether resin, and found that at a temperature of a glass transition temperature of the modified polyphenylene ether-resin+80° C., using a modified polyphenylene ether resin that had been adjusted to show a specific melt viscosity, by performing the foaming blow molding, an excellent foamed blow-molded article having a low apparent density can be obtained.

That is, at a temperature of a glass transition temperature of the modified polyphenylene ether resin+80° C., a thermoplastic resin composition containing a modified polyphenylene ether resin that shows a specific melt viscosity and a blowing agent are kneaded to forma foamable molten resin, and by extruding the foamable molten resin through a die, excessive draw down is suppressed, thus a foamed parison that can maintain the softened state and is in a favorable foamed state, can be formed. Therefore, the foamed parison is excellent in the blow moldability, and a foamed blow-molded article having a low apparent density can be obtained.

In the present invention, a thermoplastic resin composition containing a mixed resin of a polyphenylene ether resin and a polystyrene resin, which can obtain an excellent foamed blow-molded article, has the glass transition temperature of 110° C. or higher, and the melt viscosity of 3000 to 9500 Pa·s at a temperature of the glass transition temperature+80° C. and at a shear rate of 100/sec.

In the present invention, from the viewpoint of not impairing the heat resistance that is characteristics of a modified polyphenylene ether resin, the glass transition temperature of a thermoplastic resin composition containing a mixed resin of a polyphenylene ether resin and a polystyrene resin is required to be 110° C. or higher, preferably 120° C. or higher, more preferably 130° C. or higher, and furthermore preferably 140° C. or higher. The upper limit of the glass transition temperature is generally around 170° C.

In the present invention, it is required that in the thermoplastic resin composition containing a mixed resin of a polyphenylene ether resin and a polystyrene resin, the melt viscosity at a temperature of the glass transition temperature+80° C. and a shear rate of 100/sec is 3000 Pa·s to 9500 Pa·s.

In the case where the melt viscosity is excessively low, when the foamable molten resin composition is extruded through a die at the appropriate foaming temperature, excessive draw down of the foamed parison cannot be prevented. In the ordinary non-foam solid blow molding, with the lowering of the foaming temperature, draw down of the parison can be suppressed. However, originally, in the foaming blow molding, in order to form a foamed parison having an excellent cell structure, it is required to form a parison at a lower temperature than that in the solid blow molding. Therefore, when the foaming temperature is excessively low, the foamed parison is solidified before the blow molding, and the blow moldability is significantly deteriorated, thus the favorable foamed blow-molded article cannot be obtained. From the viewpoint described above, in the above-described thermoplastic resin composition, the melt viscosity at a temperature of the glass transition temperature+80° C. and at a shear rate of 100/sec is preferably 4000 Pa·s or more, and more preferably 6000 Pa·s or more.

On the other hand, when the melt viscosity described above is excessively high, shear heat is readily excessively generated in a die, and thus there is a risk that the foamed parison extruded through a die forms open cells, or a risk that the foamed parison shrinks before the blow molding. Further, when the melt viscosity described above is excessively high, a molten resin composition cannot be extruded in a short time at the appropriate foaming temperature, and thus there is a risk that the foamed parison is solidified before the blow molding. By the increase of the foaming temperature, the formation of the foamed parison can be completed by extruding the molten resin composition in a short time, however, a foamed parison that has an excellent cell structure cannot be obtained, and therefore, an excellent foamed blow-molded article cannot be also obtained. From the viewpoint described above, in the above-described thermoplastic resin composition, the melt viscosity at a temperature of the glass transition temperature+80° C. and a shear rate of 100/sec is preferably 9000 Pa·s or less.

The present invention prepares a hollow foamed blow-molded article by, extruding a foamable molten resin composition obtained by kneading a thermoplastic resin composition containing a mixed resin of a polyphenylene ether resin and a polystyrene resin as a base resin and a blowing agent by an extruder through a die to form a foamed parison, and blow molding the foamed parison by sandwiching the foamed parison between molds during the foamed parison being in a softened state to obtain a hollow foamed blow-molded article. When blow molding of the foamed parison is performed, by the blow molding while sucking from the outside the space between the mold and the external side of the foamed parison, that is, between the external side of the foamed parison and the inner surface of the mold, a hollow foamed blow-molded article that reflects the shape of mold, and has a beautiful surface can be obtained.

The polyphenylene ether resin in the present invention is a polymer having a repeating unit represented by the following general formula. In the following formula, each of $R_1$, $R_2$, $R_3$, and $R_4$ independently represents hydrogen, halogen, an alkyl group, an alkoxy group, a phenyl group, or a haloalkyl group having two or more carbon atoms between halogen and a benzene ring in the formula or a haloalkoxy group containing no third α-carbon. n is an integer representing a degree of polymerization.

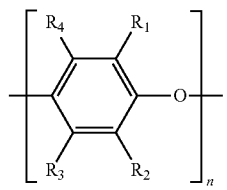

Examples of the above-described polyphenylene ether resin include, for example, poly(2,6-dimethyl-1,4-phenylene)ether, poly(2,6-diethyl-1,4-phenylene)ether, poly(2-methyl-6-ethyl-1,4-phenylene)ether, poly(2-methyl-6-propyl-1,4-phenylene)ether, poly(2,6-dipropyl-1,4-phenylene)ether, poly(2-ethyl-6-propyl-1,4-phenylene)ether, poly(2,6-dibutyl-1,4-phenylene)ether, poly(2,6-dilauryl-1,4-phenylene)ether, poly(2,6-diphenyl-1,4-diphenylene)ether, poly(2,6-dimethoxy-1,4-diphenylene)ether, poly(2,6-diethoxy-1,4-diphenylene)ether, poly(2-methoxy-6-ethoxy-1,4-phenylene)ether, poly(2-ethyl-6-stearyloxy-1,4-phenylene)ether, poly(2,6-dichloro-1,4-phenylene)ether, poly(2-methyl-6-phenyl-1,4-phenylene)ether, poly(2,6-benzyl-1,4-phenylene)ether, poly(2-ethoxy-1,4-phenylene)ether, poly(2-chloro-1,4-phenylene)ether, and poly(2-dibromo-1,4-phenylene)ether. However, the examples are not limited to these, in particular, in the formula, each of $R_1$ and $R_2$ is preferably an alkyl group having 1 to 4 carbon atoms, and each of $R_3$ and $R_4$ is preferably hydrogen or an alkyl group having 1 to 4 carbon atoms.

The polystyrene resin in the present invention is a homopolymer of styrene monomer, a copolymer of 2 or more kinds of styrene monomers, or a copolymer of a styrene monomer that is mainly composed of styrene monomer, and other monomers. Examples of the styrene monomer include styrene, o-, m-, p-styrene, t-butylstyrene, α-methylstyrene, β-methylstyrene, chlorostyrene, and diphenylstyrene. Examples of the polystyrene resin include polystyrene, a styrene-butadiene copolymer, a styrene-acrylonitrile copolymer, a styrene-methyl methacrylate copolymer, a styrene-methyl acrylate copolymer, a styrene-maleic acid copolymer, a styrene-maleic anhydride copolymer, a styrene-maleimide copolymer, a styrene-methacrylic acid copolymer, a styrene-acrylic acid copolymer, a styrene-α-methylstyrene copolymer, an ABS resin, and a butadiene-acrylonitrile-α-methylbenzene-divinylbenzene copolymer.

By appropriately selecting the melt viscosity of a polystyrene resin to be blended to a polyphenylene ether resin, and blending the polystyrene resin, the melt viscosity of the thermoplastic resin composition can be adjusted to be in the above range. The ratio of the polyphenylene ether resin in the thermoplastic resin composition in which the glass transition temperature and the melt viscosity satisfy the values described above is preferably 20 to 70% by weight, and more preferably 50 to 65% by weight.

Further, by adding a plasticizer such as liquid paraffin into the thermoplastic resin composition, the melt viscosity of the thermoplastic resin composition can be adjusted. In that case, the addition amount of the plasticizer is preferably 3% by weight or less, and more preferably 0.5% by weight or less in the thermoplastic resin composition.

In the thermoplastic resin composition containing a mixed resin of a polyphenylene ether resin and a polystyrene resin according to the present invention, for the purpose of imparting flame retardancy, a flame retardant can be mixed. When a specific phosphorus type flame retardant is mixed in the thermoplastic resin composition, the glass transition temperature is lowered by the plasticization effect of the flame retardant, the melt viscosity at a temperature of the glass transition temperature+80° C. and at a shear rate of 100/sec also tends to decrease, and thus the melt viscosity of the thermoplastic resin composition can be adjusted. From the viewpoint of adjusting the melt viscosity of the thermoplastic resin composition and further imparting advanced flame retardancy to a hollow foamed blow-molded article, the blending amount of the flame retardant is preferably 5 to 15% by weight in the thermoplastic resin composition.

A hollow foamed blow-molded article obtained by preparing a foamed parison from the thermoplastic resin composition containing a phosphorus type flame retardant according to the present invention, as a base resin, and blow molding the foamed parison, shows excellent flame retardancy, and preferably shows excellent flame retardancy of V-1 or V-0 as measured in accordance with the burn test UL-94 vertical test (20 mm vertical burn test) in the UL standards. In particular, in order to ensure the flame retardancy of V-0, the blending amount of the flame retardant is preferably 7 to 15% by weight.

The flame retardant used in the present invention is a phosphorus type flame retardant having a melting point of 100° C. or lower. Examples of the phosphorus type flame retardant include aromatic phosphate such as triphenyl phosphate, tricresyl phosphate, cresyl diphenyl phosphate, trixylenyl phosphate, and 2-naphthyl diphenyl phosphate; and aromatic condensed phosphate such as 1,3-phenylene bis(diphenyl phosphate), bisphenol A bis(diphenyl phosphate), and 1,3-phenylene bis(dixylenyl) phosphate.

The thermoplastic resin composition in the present invention can be obtained by supplying a polyphenylene ether resin, a polystyrene resin, and an additive such as a flame retardant and a plasticizer, which is blended as required, into an extruder for foaming blow molding respectively, to perform the melt-kneading. Further, the polyphenylene ether resin, the polystyrene resin, and the additive such as a flame retardant and a plasticizer, which is blended as required, are kneaded in advance by another extruder to prepare a thermoplastic resin composition, and then the thermoplastic resin composition can also be supplied into an extruder for foaming blow molding. Further, part of the polyphenylene ether resin, the polystyren resin, and the additive such as a flame retardant and a plasticizer, which is blended as required, and another part of them that has kneaded in advance by an extruder, may be supplied to an extruder for foaming blow molding in combination.

As a blowing agent in the present invention, a physical blowing agent containing a hydrocarbon compound having 3 to 5 carbon atoms is used. Examples of the hydrocarbon compound having 3 to 5 carbon atoms include, for example, propane, n-butane, isobutane, n-pentane, isopentane, neopentane, and cyclopentane, among them n-butane, isobutane, or a mixture thereof is preferable. Further, a hydrocarbon compound other than the above, such as n-hexane, isohexane, and cyclohexane; chlorohydrocarbon such as methyl chloride and ethyl chloride; fluorohydrocarbon such as 1,1,1,2-tetrafluoroethane and 1,1-difluoroethane; alcohols such as methanol and ethanol; inorganic gas such as carbon dioxide, nitrogen gas, and air; and the like can be appropriately mixed and used. The content of the hydrocarbon compound having 3 to 5 carbon atoms in a physical blowing agent is preferably 50 mol % or more, more preferably 70 mol % or more, furthermore preferably 90 mol % or more, and particularly preferably 100 mol %.

The amount of a blowing agent in the present invention to be used is appropriately determined by the intended expansion ratio, and in the foaming blow molding of the present invention, the amount to be used is 0.4 to 1 mol per 1 kg of the thermoplastic resin composition.

In the hollow foamed blow-molded article that is produced by the foaming blow molding according to the present invention, the apparent density is preferably 0.07 to 0.3 g/cm$^3$, and more preferably 0.1 to 0.2 g/cm$^3$.

In the hollow foamed blow-molded article that is produced by the foaming blow molding according to the present invention, the average thickness (average wall thickness) is preferably 1 to 15 mm, and more preferably 5 to 13 mm.

In the hollow foamed blow-molded article that is produced by the foaming blow molding according to the present invention, the closed cell ratio is preferably 30% or more, and more preferably 40% or more, and furthermore preferably 50% or more.

In the present invention, within a range that does not give any difficulties to the foaming blow molding, other components, except for the polyphenylene ether resin and the polystyrene resin, for example, a thermoplastic resin including a polyolefin resin such as polyethylene and polypropylene, a polyester resin such as polyethylene terephthalate and polylactic acid; styrene elastomer; styrene-butadiene rubber; and the like can be mixed. The blending amount is in general, preferably 20 parts by weight or less, more preferably 10 parts by weight or less, and furthermore preferably 5 parts by weight or less relative to 100 parts by weight of the total amount of the polyphenylene ether resin and the polystyrene resin. In addition, according to the demand, a cell controlling agent, an antioxidant, a heat stabilizer, pigment, dye, an antistatic agent, a weather resistance improving agent, an inorganic filler, and the like can be added.

[Glass Transition Temperature (Tg)]

The glass transition temperature in the present invention is a midpoint glass transition temperature, as measured in accordance with JIS K7121(1987), with the use of "Conditioning of test pieces (3)", by heat flux differential scanning calorimetry (heat flux DSC), under the conditions of a heating rate of 10° C./min and a cooling rate of 10° C./min. Further, for example, in the case where a thermoplastic resin composition is prepared by supplying a polyphenylene ether resin, a polystyrene resin, a flame retardant and a plasticizer that are to be blended as required, into an extruder for foaming blow molding to perform the melt-kneading; and the like, when the glass transition temperature of the thermoplastic resin composition cannot be measured in advance, a sample for measurement may be prepared by the melt-kneading of the above components by another extruder at the same blending ratio under the same conditions in advance, and used. Further, when the glass transition temperature of a thermoplastic resin composition constituting the foamed blow-molded article is measured, a foamed blow-molded article is, for example, heated to around 250° C., to remove the residual blowing agent and to perform the defoaming, so that a sample for measurement is prepared, and thus prepared sample for measurement may be used for measurement.

[Melt Viscosity]

The melt viscosity refers to a value obtained by the measurement of the thermoplastic resin composition containing a mixed resin of a polyphenylene ether resin and a polystyrene resin, which are sufficiently dried, under the conditions of a orifice diameter of 1 mm, a orifice length of 10 mm, at a temperature of the glass transition temperature (Tg) of the thermoplastic resin composition+80° C. and at a shear rate of 100/sec. As a measuring device, for example, Capirograph 1D manufactured by Toyo Seiki Seisaku-Sho, Ltd. may be used.

Further, for example, in the case where a thermoplastic resin composition is prepared by supplying a polyphenylene ether resin, a polystyrene resin, a flame retardant and a plasticizer that are to be blended as required, into an extruder for foaming blow molding to perform the melt-kneading; when the melt viscosity of the thermoplastic resin composition cannot be measured in advance, a sample for measurement may be prepared by the melt-kneading of the above components by another extruder at the same blending ratio under the same conditions in advance, and used. Further, when the melt viscosity of a thermoplastic resin composition constituting the foamed blow-molded article is measured, a foamed blow-molded article is, for example, heated to around 250° C., to remove the residual blowing agent and to perform the defoaming, so that a sample for measurement is prepared, and thus prepared sample for measurement may be used for measurement.

[Apparent Density of Foamed Blow-Molded Article]

The apparent density of a foamed blow-molded article refers to a value as determined by dividing the weight (g) of the foamed blow-molded article by the volume ($cm^3$) of the foamed blow-molded article. In addition, the volume of a foamed blow-molded article can be measured by immersing the molded article in water.

[Average Thickness of Foamed Blow-Molded Article]

The average thickness of a foamed blow-molded article refers to a value obtained by the measurement as in the following. The measurement positions of the thickness are five positions in total, which are a position near the center, two positions near both ends, and further two positions near the midpoints between the center and each of the both ends, in the longitudinal direction of the foamed blow-molded article, generally in the extrusion direction of the foamed parison, (provided that a special shape of the foamed blow-molded article, such as a fitting part, should be avoided), and further at each of these five positions, six positions at equal intervals in the circumferential direction of the molded article, thus 30 positions in total. The thickness at each of the positions is measured, the maximum and minimum values are excluded from the obtained thickness values of the 30 positions, and the arithmetic mean of the obtained values of 28 positions in total refers to the average thickness of a foamed blow-molded article. Further, in the case where there is a position of an outlet of duct or the like at which the thickness cannot be measured, in the measurement positions, the part except for the outlet of duct or the like are divided into six parts at equal intervals in the circumferential direction, and the thickness at the six positions near the center of each of the six parts is measured.

[Closed Cell Ratio]

The closed cell ratio of a foamed blow-molded article is calculated by the following equation (1), after test pieces are cut out of a foamed blow-molded article and Vx is determined according to "Procedure C" of ASTM 1D-2856-70 (reapproved in 1976).

In the case where the prescribed volume of a test piece is not cut out, multiple test pieces are superimposed so as to obtain the volume as close as possible to the prescribed volume.

$$\text{Closed cell ratio (\%)} = (Vx - Va(\rho f/\rho s)) \times 100/(Va - Va(\rho f/\rho s)) \quad (1)$$

Vx: an effective volumetric capacity ($cm^3$) of test piece (a sum of a volume of closed-cell part and a volume of resin part), Va: an apparent volume ($cm^3$) of test piece, calculated from the outside dimension, ρf: an apparent density (g/$cm^3$) of test piece, and ρs: a density (g/$cm^3$) of a base resin constituting test piece.

At near the 5 positions at which the thickness of a foamed blow-molded article has been measured, according to the measurement method described above, the closed cell ratio is measured, and the arithmetic mean of the obtained values refers to the closed cell ratio of a foamed blow-molded article. As a measuring device, Air Comparison Pycnometer (Model 930) manufactured by Toshiba Beckmann Inc. may be used.

EXAMPLES

Hereinafter, the present invention will be described in more detail by way of Examples. However, the present invention should not be construed to be limited to the following Examples.

The raw resins used in Examples and Comparative Examples are shown in the following Table 1.

TABLE 1

| Code | mPPE | GPPS1 | GPPS2 | GPPS3 |
|---|---|---|---|---|
| Kind | Modified polyphenylene ether PPE(*2)/ GPPS = 70/30 (weight ratio) | Polystyrene | Polystyrene | Polystyrene |
| Manufacturer | SABIC Innovative Plastics | PS Japan Corporation | PS Japan Corporation | PS Japan Corporation |
| Grade name | PKN4752 | 680 | 619(*3) | GX154 |
| Glass transition temperature (° C.) | 169.9 | 103.0 | 91.0 | 106.0 |
| Melt viscosity (Pa · s)(*1) | 12000 | 1640 | 1580 | 2300 |

(*1)Melt viscosity at a temperature of a glass transition temperature + 80° C. and at a shear rate of 100/sec
(*2)Poly(2,6-dimethyl-1,4-phenylene)ether
(*3)Containing 3% by weight of liquid paraffin

[Flame Retardant]

TPP: triphenyl phosphate (trade name: TPP, manufactured by DAIHACHI CHEMICAL INDUSTRY CO., LTD., a melting point of 49° C.), and PX-200: 1,3-phenylenebis(dixylenyl)phosphate (trade name: PX-200, manufactured by DAIHACHI CHEMICAL INDUSTRY CO., LTD., a melting point of 92° C.)

[Measurement Method of Foaming Temperature]

The foaming temperature is a value obtained by the measurement of a temperature of a foamable molten resin composition by a thermocouple in near the lip part of the circular die.

A foamed parison was formed under the same conditions as those in each of Examples and Comparative Examples, and without blow molding, the foamed parison was collected, after the cooling, the apparent density and average thickness of the foamed parison were measured.

[Apparent Density of Parison]

The apparent density of a foamed parison was determined by dividing the weight (g) of the foamed parison by the volume ($cm^3$) of the foamed parison. The volume of the foamed parison was measured by immersing the foamed parison in water.

[Average Thickness of Parison]

The measurement positions of the thickness were five positions in total, which are a position near the center, two positions near both ends, and further two positions near the midpoints between the center and each of the both ends, in the extrusion direction of the foamed parison, and further in each of these five positions, six positions at equal intervals in the circumferential direction that is perpendicular to the longitudinal direction, thus 30 positions in total. The thickness at each of the positions was measured, the maximum and minimum values are excluded from the obtained thickness values of the 30 positions, and the arithmetic mean of the obtained values of 28 positions in total referred to the average thickness of a parison.

[Evaluation of Foamability]

Evaluation of foamability was performed according to the following criteria.

Good: favorable parison capable of blow molding was obtained.

Poor: not foamed, or shrank immediately after the foaming and thus favorable parison was not obtained.

The apparent density, average thickness, closed cell ratio of a foamed blow-molded article are measured by the methods described above.

[Evaluation of Flame Retardancy]

By the flame retardancy as measured in accordance with the burn test UL-94 vertical test (20 mm vertical burn test) in the UL standards, flame retardancy of the foamed blow-molded article was evaluated.

Sample for Measurement

From near the center part in the longitudinal direction of a foamed blow-molded article (generally in the extrusion direction of the foamed parison), 5 test pieces were cut out such that the length is 125±5 mm, the width is 13.0±0.5 mm, and the thickness is 13 mm or less. Further, in the case where the thickness of a foamed blow-molded article exceeded 13 mm, test pieces were cut out such that the thickness is 13 mm or less, and used for the measurement.

Evaluation Criteria

V-1: There is no sample burning for 30 seconds or more after any of the flame contacts.
  The total flame burn time of 10 times of flame contacts for each of the five samples does not exceed 250 seconds.
  There is no sample burning to the position of the fixing clamp.
  There is no sample for dropping the burning particles that ignite the cotton wool placed on the lower side.
  There is no sample growing for 60 seconds or more after the second flame contact.

V-0: there is no sample burning for 10 seconds or more after any of the flame contacts.
  The total flame burn time of 10 times of flame contacts for each of the five samples does not exceed 50 seconds.
  There is no sample burning to the position of the fixing clamp.
  There is no sample for dropping the burning particles that ignite the cotton wool placed on the lower side.
  There is no sample growing for 30 seconds or more after the second flame contact.

Examples 1 to 18 and Comparative Examples 1 and 2

As a mold, a mold for molding a duct having a maximum length of 650 mm, a maximum width of 150 mm, and a maximum height of 70 mm was used.

In order to obtain the compounding ratios shown in Tables 2 and 3, a polyphenylene ether resin (PPE resin), a polystyrene resin (PS resin), liquid paraffin and a flame retardant that are blended as required, and 0.3 part by weight of talc as a cell controlling agent, were supplied into an extruder having an inner diameter of 65 mm, and kneaded in the extruder set at 250° C. In addition, the blending amount of the talc refers to an amount relative to 100 parts by weight of the thermoplastic resin composition. From the supply port of a blowing agent in the extruder, butane (i-butane: n-butane=30:70) was pressed in an amount shown in Tables 2 and 3 as a blowing agent into a thermoplastic resin composition in a molten state, and further kneaded to prepare a foamable molten resin composition, the obtained foamable molten resin composition was cooled to a foaming appropriate temperature, and fed into an accumulator. In addition, the blending amount of a blowing agent shown in Tables 2 and 3 refers to an amount per 1 kg of the thermoplastic resin composition. After that, from the circular die having die lips with a diameter of 90 mm, the foamable molten resin composition was extruded into an ambient pressure area to form a tubular foamed parison. While blowing pre-blow air into an interior space of the foamed parison, the foamed parison was placed between two-split type molds disposed immediately beneath the die, then the molds were closed to sandwich the foamed parison in the molds. Subsequently, a blow pin was inserted into an interior space of the foamed parison, and blow air at 0.2 MPa(G) was blown from the blow pin into an interior space of the foamed parison, in addition the outer surface of the foamed parison was sucked from the suction hole provided to the mold to press the outer surface of the foamed parison against the inside wall of the molds, and thus the foaming blow molding was performed. After cooling, the molds were opened and the foamed blow-molded product was taken out of the molds, burrs were removed from the foamed blow-molded product to obtain a hollow foamed blow-molded article. Properties of the obtained hollow foamed blow-molded articles are shown in Tables 2 and 3.

TABLE 2

| | | | | Example 1 | Example 2 | Example 3 | Example 4 | Example 5 | Example 6 | Example 7 |
|---|---|---|---|---|---|---|---|---|---|---|
| Production conditions | Raw material mixture | mPPE | Part by weight | 90 | 90 | 80 | 50 | 30 | 90 | 80 |
| | | GPPS1 | Part by weight | 10 | — | 20 | 50 | — | 10 | 20 |
| | | GPPS2 | Part by weight | — | 10 | — | — | 70 | — | — |
| | | GPPS3 | Part by weight | — | — | — | — | — | — | — |
| | Thermoplastic resin composition | PPE resin | % by weight | 63 | 63 | 56 | 35 | 21 | 63 | 56 |
| | | PS resin | % by weight | 37 | 36.7 | 44 | 65 | 76.9 | 37 | 44 |
| | | Liquid paraffin | % by weight | — | 0.3 | — | — | 2.1 | — | — |
| | | Glass transition temperature | ° C. | 160.4 | 160.5 | 153.4 | 133.6 | 111.0 | 160.4 | 153.4 |

TABLE 2-continued

|  |  |  | | | | | | | |
|---|---|---|---|---|---|---|---|---|---|
| | | Melt viscosity | Pa·s | 8500 | 8980 | 7230 | 4860 | 3610 | 8500 | 7230 |
| | Physical blowing agent | Kind | — | Butane | Butane | Butane | Butane | Butane | Butane | Butane |
| | | Blending amount | Mol/kg | 0.4 | 0.4 | 0.4 | 0.4 | 0.4 | 0.5 | 0.5 |
| | Cell controlling agent | Kind | — | Talc | Talc | Talc | Talc | Talc | Talc | Talc |
| | | Blending amount | Part by weight | 0.3 | 0.3 | 0.3 | 0.3 | 0.3 | 0.3 | 0.3 |
| | Foaming temperature | | °C. | 233 | 229 | 230 | 214 | 195 | 228 | 224 |
| | Evaluation of foamability | | — | Good | Good | Good | Good | Good | Good | Good |
| | Apparent density of parison | | g/cm³ | 0.14 | 0.11 | 0.13 | 0.13 | 0.13 | 0.12 | 0.11 |
| | Average thickness of parison | | mm | 12.4 | 13.4 | 13.0 | 13.0 | 12.0 | 12.0 | 12.6 |
| | Blow pressure | | MPa(G) | 0.2 | 0.2 | 0.2 | 0.2 | 0.2 | 0.2 | 0.2 |
| Properties of molded article | Apparent density | | g/cm³ | 0.15 | 0.12 | 0.13 | 0.18 | 0.18 | 0.15 | 0.14 |
| | Density increase rate | | % | 107 | 109 | 100 | 138 | 138 | 125 | 127 |
| | Average thickness | | mm | 10.0 | 11.0 | 12.0 | 8.5 | 8.0 | 9.0 | 9.0 |
| | Closed cell ratio | | % | 53 | 46 | 63 | 49 | 76 | 41 | 44 |

|  |  |  |  | Example 8 | Example 9 | Example 10 | Example 11 | Example 12 | Comparative Example 1 |
|---|---|---|---|---|---|---|---|---|---|
| Production conditions | Raw material mixture | mPPE | Part by weight | 80 | 50 | 90 | 80 | 50 | 95 |
| | | GPPS1 | Part by weight | — | 50 | 10 | 20 | 50 | 5 |
| | | GPPS2 | Part by weight | — | — | — | — | — | — |
| | | GPPS3 | Part by weight | 20 | — | — | — | — | — |
| | Thermoplastic resin composition | PPE resin | % by weight | 56 | 35 | 63 | 56 | 35 | 66.5 |
| | | PS resin | % by weight | 44 | 65 | 37 | 44 | 65 | 33.5 |
| | | Liquid paraffin | % by weight | — | — | — | — | — | — |
| | | Glass transition temperature | °C. | 152.0 | 133.6 | 160.4 | 153.4 | 133.6 | 163.8 |
| | | Melt viscosity | Pa·s | 7850 | 4860 | 8500 | 7230 | 4860 | 10000 |
| | Physical blowing agent | Kind | — | Butane | Butane | Butane | Butane | Butane | Butane |
| | | Blending amount | Mol/kg | 0.5 | 0.6 | 0.6 | 0.6 | 0.6 | 0.4 |
| | Cell controlling agent | Kind | — | Talc | Talc | Talc | Talc | Talc | Talc |
| | | Blending amount | Part by weight | 0.3 | 0.3 | 0.3 | 0.3 | 0.3 | 0.3 |
| | Foaming temperature | | °C. | 233 | 212 | 226 | 220 | 210 | 237 |
| | Evaluation of foamability | | — | Good | Good | Good | Good | Good | Poor |
| | Apparent density of parison | | g/cm³ | 0.10 | 0.12 | 0.11 | 0.10 | 0.13 | — |
| | Average thickness of parison | | mm | 13.5 | 11.5 | 13.8 | 13.1 | 11.0 | — |
| | Blow pressure | | MPa(G) | 0.2 | 0.2 | 0.2 | 0.2 | 0.2 | — |
| Properties of molded article | Apparent density | | g/cm³ | 0.13 | 0.17 | 0.13 | 0.13 | 0.22 | — |
| | Density increase rate | | % | 130 | 142 | 118 | 130 | 169 | — |
| | Average thickness | | mm | 11.5 | 8.0 | 9.0 | 10.0 | 7.0 | — |
| | Closed cell ratio | | % | 62 | 41 | 55 | 40 | 42 | — |

TABLE 3

|  |  |  |  | Example 13 | Example 14 | Example 15 | Example 16 | Example 17 | Example 18 | Comparative Example 2 |
|---|---|---|---|---|---|---|---|---|---|---|
| Production conditions | Raw material mixture | mPPE | Part by weight | 85 | 90 | 93 | 95 | 85 | 90 | 93 |
| | | TPP | Part by weight | 15 | 10 | 7 | 5 | — | — | — |
| | | PX-200 | Part by weight | — | — | — | — | 15 | 10 | 7 |
| | Thermoplastic resin composition | PPE resin | % by weight | 59.5 | 63 | 65.1 | 66.5 | 59.5 | 63 | 65.1 |
| | | PS resin | % by weight | 25.5 | 27 | 27.9 | 28.5 | 25.5 | 27 | 27.9 |
| | | Phosphous type flame retardant | % by weight | 15 | 10 | 7 | 5 | 15 | 10 | 7 |
| | | Glass transition temperature | °C. | 143.7 | 145.2 | 153.4 | 158.0 | 143.2 | 147.6 | 150.3 |
| | | Melt viscosity | Pa·s | 5300 | 8030 | 8280 | 8540 | 8100 | 8980 | 11200 |
| | Physical blowing agent | Kind | — | Butane | Butane | Butane | Butane | Butane | Butane | Butane |
| | | Blending amount | Mol/kg | 0.6 | 0.6 | 0.6 | 0.6 | 0.4 | 0.4 | 0.4 |
| | Cell controlling agent | Kind | — | Talc | Talc | Talc | Talc | Talc | Talc | Talc |
| | | Blending amount | Part by weight | 0.3 | 0.3 | 0.3 | 0.3 | 0.3 | 0.3 | 0.3 |
| | Foaming temperature | | °C. | 207 | 220 | 225 | 233 | 220 | 230 | 235 |
| | Evaluation of foamability | | — | Good | Good | Good | Good | Good | Good | Poor |

TABLE 3-continued

|  |  |  | Example 13 | Example 14 | Example 15 | Example 16 | Example 17 | Example 18 | Comparative Example 2 |
|---|---|---|---|---|---|---|---|---|---|
|  | Apparent density of parison | g/cm³ | 0.10 | 0.11 | 0.11 | 0.11 | 0.14 | 0.16 | — |
|  | Average thickness of parison | mm | 10.5 | 11.2 | 10.8 | 11.1 | 9.5 | 9.2 | — |
|  | Blow pressure | MPa (G) | 0.2 | 0.2 | 0.2 | 0.2 | 0.2 | 0.2 | — |
| Properties | Apparent density | g/cm³ | 0.12 | 0.13 | 0.13 | 0.13 | 0.17 | 0.2 | — |
| of molded | Density increase rate | % | 120 | 118 | 118 | 118 | 121 | 125 | — |
| article | Average thickness | mm | 7.1 | 7.4 | 7.2 | 8.5 | 8.6 | 7.5 | — |
|  | Closed cell ratio | % | 58 | 62 | 40 | 76 | 81 | 82 | — |
|  | Flame retardancy | — | — | V-0 | V-0 | V-0 | V-1 | V-0 | V-0 | — |

TPP = triphenyl phosphate,
PX-200 = 1,3-phenylenebis(dixylenyl)phosphate

What is claimed is:

1. A method for producing a thermoplastic resin foamed blow-molded article, comprising:
   extruding a foamable molten resin obtained by kneading a thermoplastic resin composition containing a mixed resin of a polyphenylene ether resin and a polystyrene as a base resin, and a physical blowing agent by an extruder, through a die to form a foamed parison; and
   blow molding the foamed parison while in a softened state to produce a foamed blow-molded article,
   wherein a glass transition temperature of the thermoplastic resin composition is 110° C. or higher, a melt viscosity of the thermoplastic resin composition at a temperature of the glass transition temperature+80° C. and at a shear rate of 100/sec is 3000 to 9500 Pa·s, the physical blowing agent is a blowing agent containing a hydrocarbon compound having 3 to 5 carbon atoms, and a blending amount of the physical blowing agent is 0.4 to 1 mol per 1 kg of the thermoplastic resin composition.

2. The method for producing a thermoplastic resin foamed blow-molded article according to claim 1,
   wherein a blending amount of a polyphenylene ether resin in the thermoplastic resin composition is 20 to 70% by weight.

3. The method for producing a thermoplastic resin foamed blow-molded article according to claim 1,
   wherein the thermoplastic resin composition is blended with a phosphorus type flame retardant having a melting point of 100° C. or lower, and the blending amount of the phosphorus type flame retardant is 5 to 15% by weight relative to the thermoplastic resin composition.

4. The method for producing a thermoplastic resin foamed blow-molded article according to claim 3, wherein the phosphorus-based flame retardant having a melting point of 100° C. or lower is an aromatic phosphate, or an aromatic condensed phosphate.

* * * * *